(12) United States Patent
Mezue

(10) Patent No.: US 8,353,491 B2
(45) Date of Patent: Jan. 15, 2013

(54) METHOD FOR ATTACHING A HAND HELD ELECTRONIC DEVICE TO A SOFT OBJECT AND COUPLING THEREFOR

(76) Inventor: Arthur E. Mezue, Central Islip, NY (US)

( * ) Notice: Subject to any disclaimer, the term of this patent is extended or adjusted under 35 U.S.C. 154(b) by 188 days.

(21) Appl. No.: 12/927,548

(22) Filed: Nov. 17, 2010

(65) Prior Publication Data

US 2011/0317341 A1  Dec. 29, 2011

Related U.S. Application Data

(60) Provisional application No. 61/283,376, filed on Dec. 3, 2009.

(51) Int. Cl.
*F16M 11/00* (2006.01)
(52) U.S. Cl. .................. 248/205.1; 24/23; 248/309.1
(58) Field of Classification Search ............ 248/309.1, 248/309.2, 310, 309.4, 686, 685, 205.3, 205.4, 248/206.5, 205.1, 205.2; 24/23, 304
See application file for complete search history.

(56) References Cited

U.S. PATENT DOCUMENTS

| | | | |
|---|---|---|---|
| 6,757,401 B2 * | 6/2004 | Uchimura et al. ............ 381/361 |
| 7,891,616 B2 * | 2/2011 | Pinchuk et al. ............ 248/206.5 |
| 2006/0231713 A1 * | 10/2006 | Crain et al. ................ 248/309.1 |
| 2008/0121273 A1 * | 5/2008 | Plaisted et al. ................ 136/251 |
| 2008/0148528 A1 * | 6/2008 | Jones ............................. 24/3.3 |
| 2010/0001155 A1 * | 1/2010 | Grundy et al. ........... 248/231.81 |

* cited by examiner

*Primary Examiner* — Ramon Ramirez
(74) *Attorney, Agent, or Firm* — Ted Masters

(57) ABSTRACT

A coupling for attaching a hand held electronic device to a soft object includes a first connector for removable attaching the coupling to the hand held electronic device, and an opposite second connector for removably attaching the coupling to the soft object. In an embodiment the first connector is rotatable with respect to the second connector, so that once attached the hand held electronic device can be rotated to a desired angular position. In another embodiment, the hand held electronic device has a removable cover, and the coupling is attached to the removable cover.

11 Claims, 11 Drawing Sheets

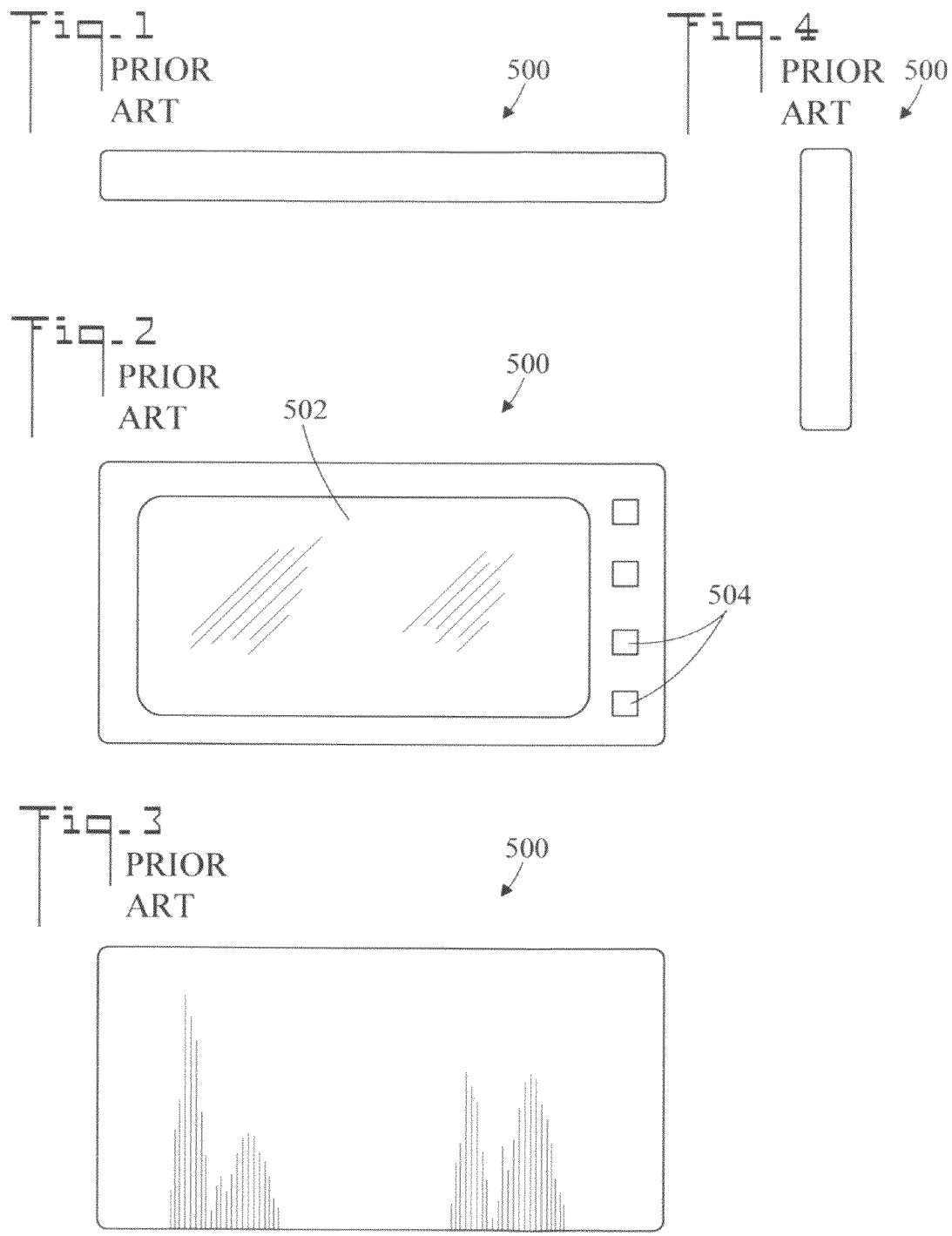

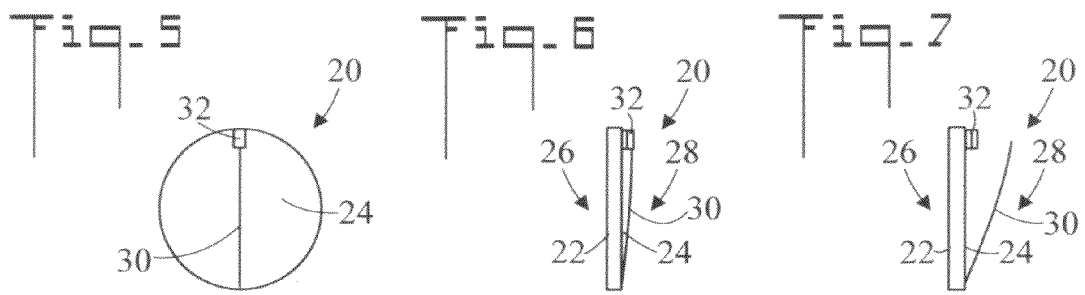
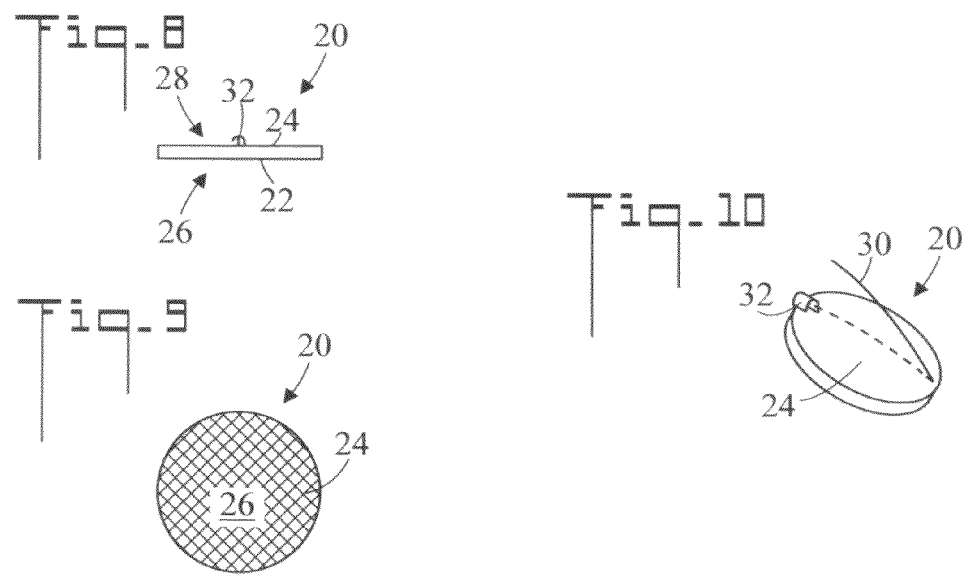
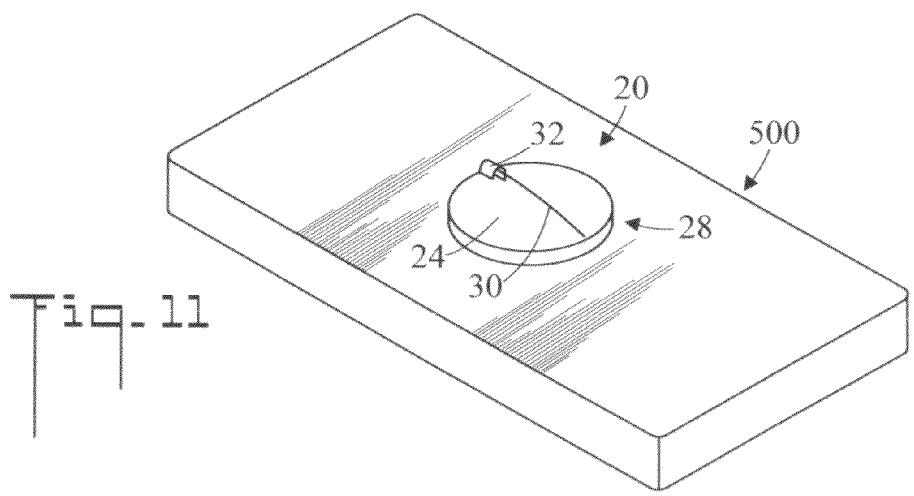

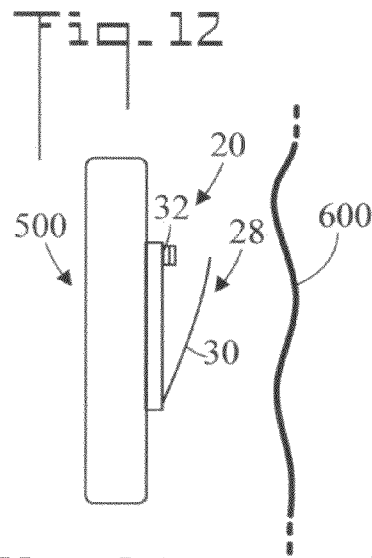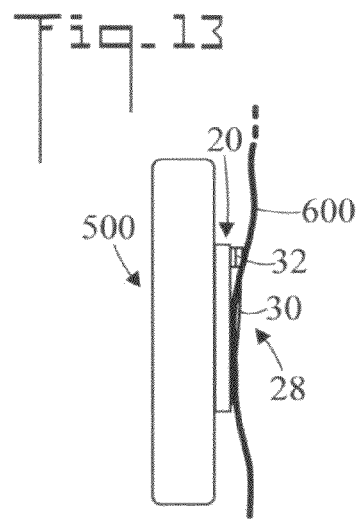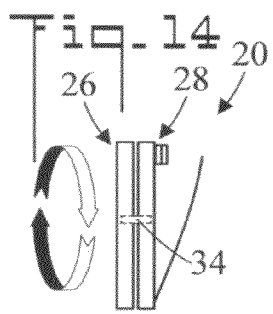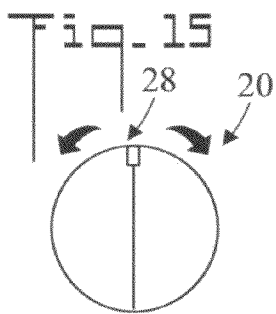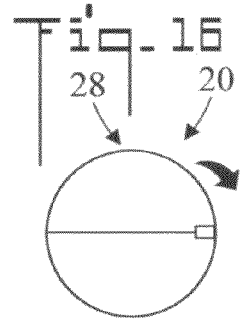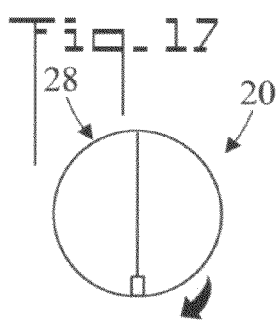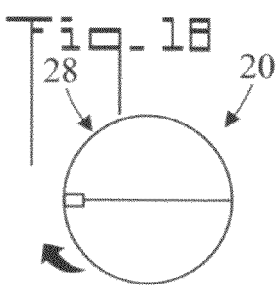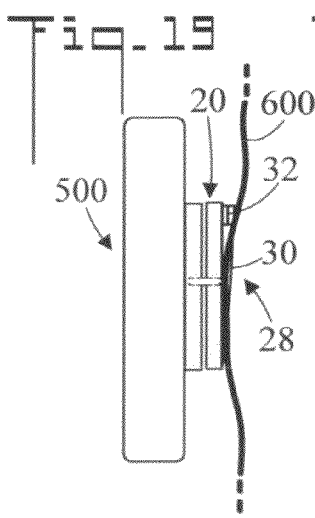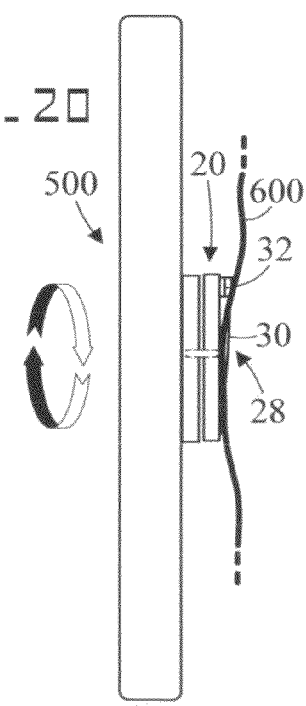

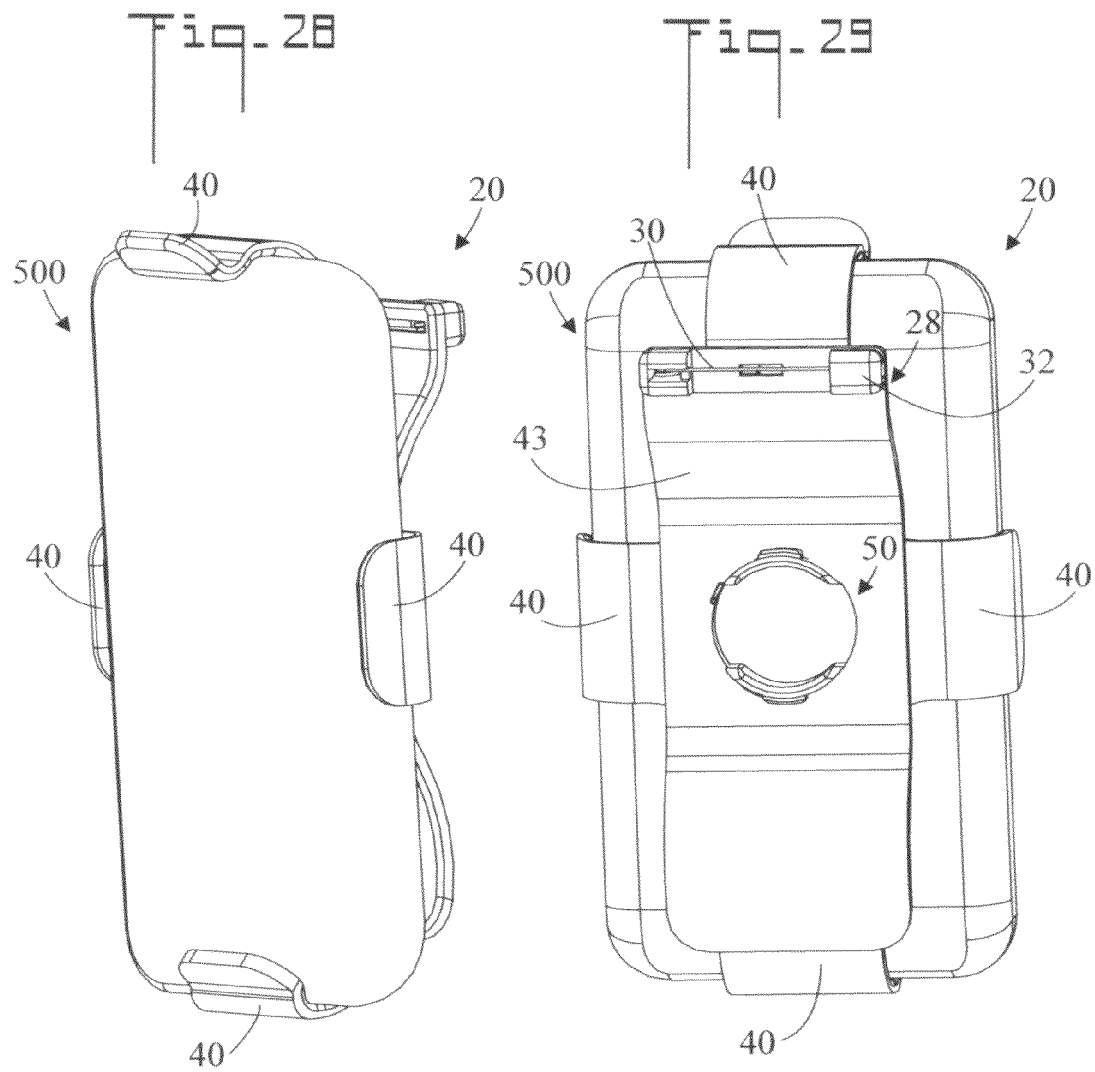

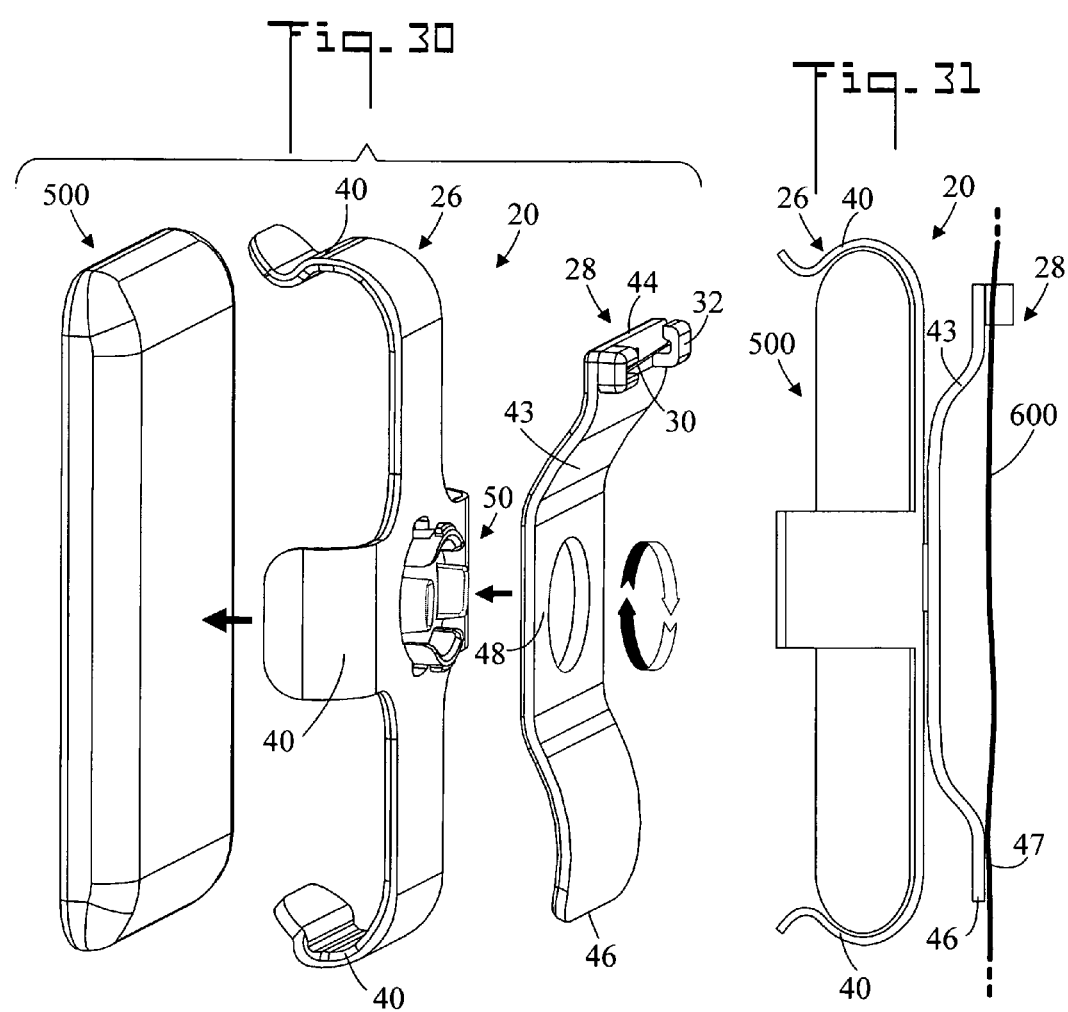

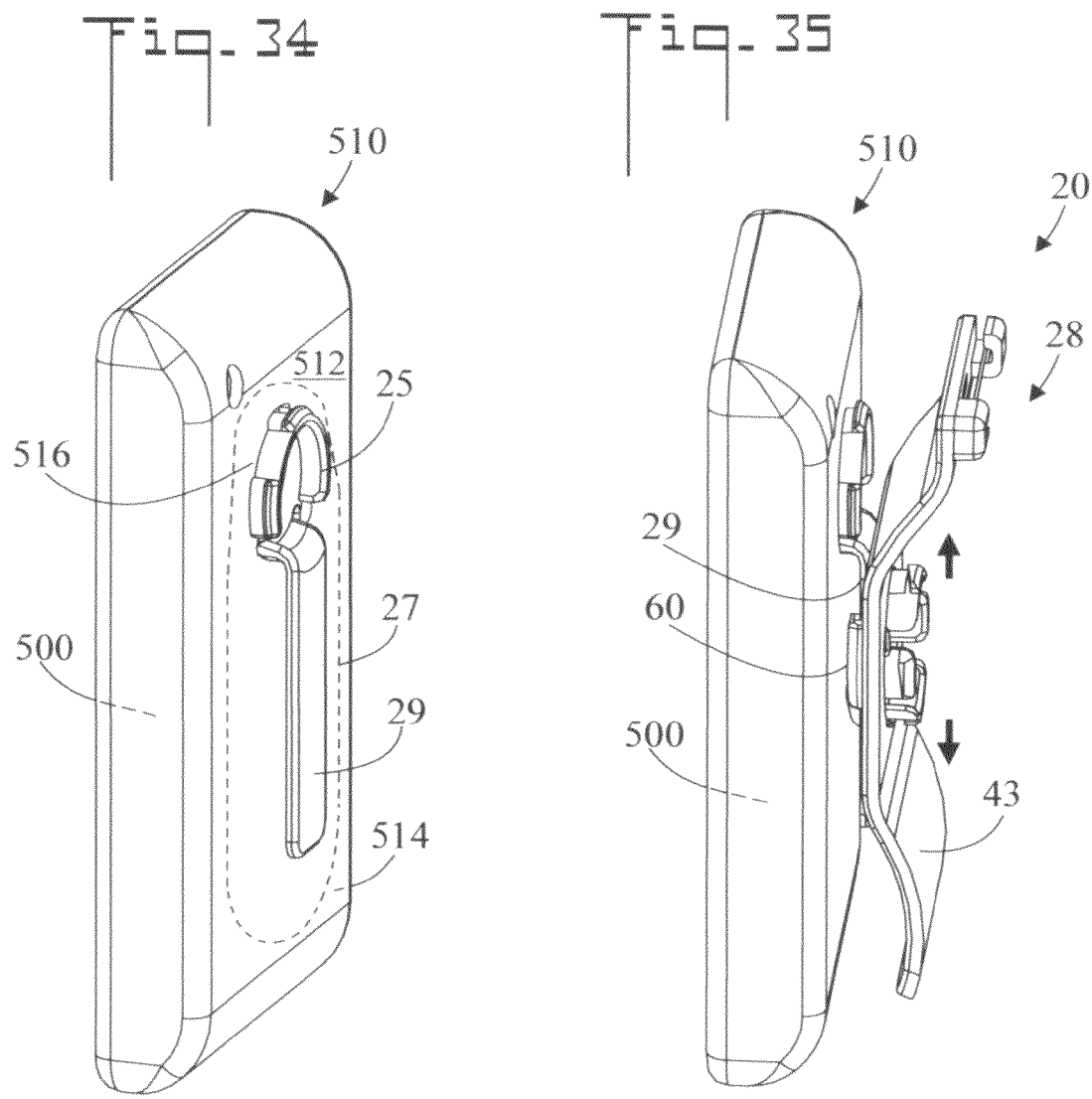

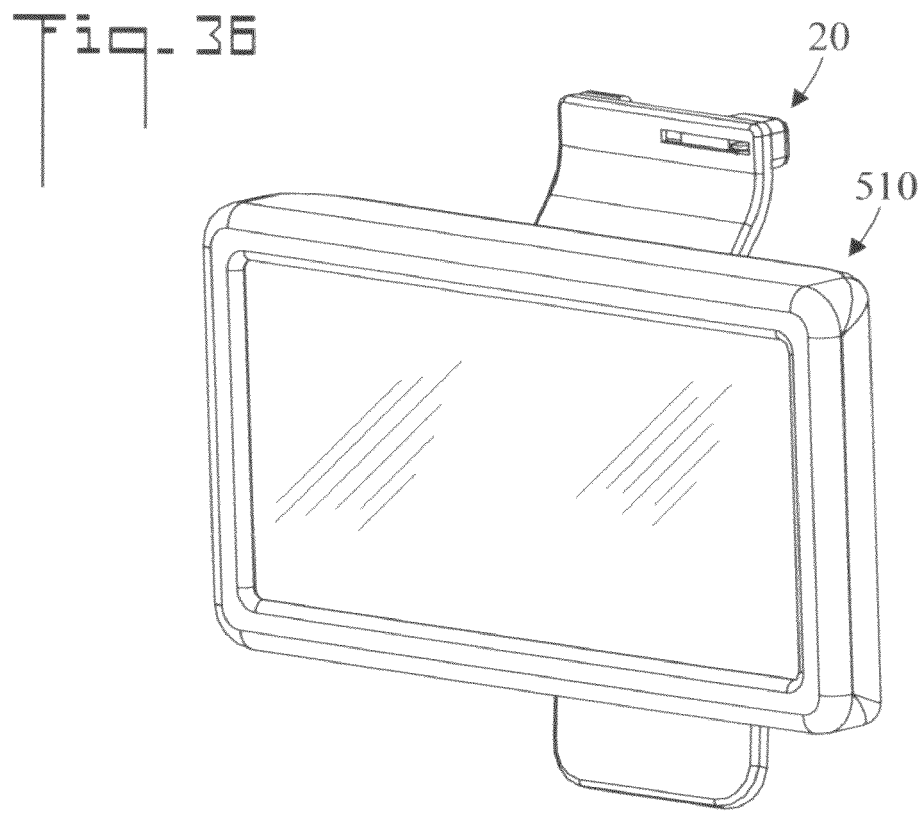
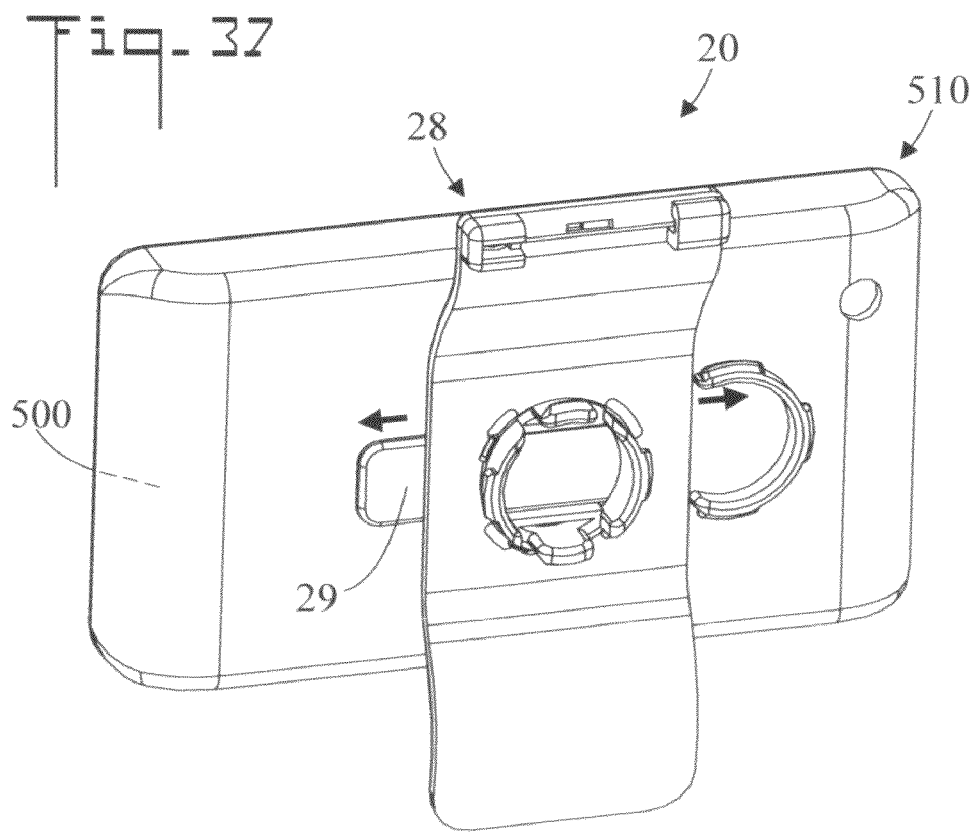

METHOD FOR ATTACHING A HAND HELD ELECTRONIC DEVICE TO A SOFT OBJECT AND COUPLING THEREFOR

CROSS REFERENCE TO RELATED APPLICATION

This application claims the filing benefit under 35 U.S.C. §119(e) of U.S. Provisional Application No. 61/283,376, filed Dec. 3, 2009, which is hereby incorporated by reference.

TECHNICAL FIELD

The present invention pertains generally to hand held electronic devices, and more particularly to a coupling and method for removably attaching the hand held electronic device to a soft object.

BACKGROUND OF THE INVENTION

When using a hand held electronic device, it is sometimes convenient to place the device on a stationary object to free the user's hands for other tasks. This is usually possible when a firm object such as a table, desk, or the like is available. However, when only soft objects such as furniture, pillows, clothing, or bedding are available, there is no convenient way to support the hand held electronic device.

BRIEF SUMMARY OF THE INVENTION

The present invention is directed to a coupling for attaching a hand held electronic device to a soft object. One side of the coupling removably attaches to the hand held electronic device, and the other side of the coupling attaches to the soft object. When the hand held electronic device is attached to the soft object, the user can view and operate the hand held electronic device without the need to hold it is his or her hand.

In accordance with an embodiment, a coupling for attaching a hand held electronic device to a soft object includes a first side and an opposite second side. A first connector for removably attaching the coupling to the hand held electronic device is disposed on the first side of coupling. A second connector for removably attaching the coupling to the soft object is disposed on the second side of the coupling, the second connector includes a pin.

In accordance with another embodiment, the first connector includes a holder which accepts and holds the hand held electronic device.

In accordance with another embodiment, the second connector includes a flange having a first end, an opposite second end, and a central portion. The pin is disposed at the first end of the flange. The first connector and the second connector are rotationally connected so that flange rotates about the central portion.

In accordance with another embodiment, when the second connector is attached to the soft object, the second end of the flange abuts the soft object and retains the hand held electronic device substantially parallel to the surface of the soft object.

In accordance with another embodiment, the first connector is rotatable with respect to the second connector.

In accordance with another embodiment, a detent mechanism connects the first connector and the second connector. The detent mechanism stops and releases the rotation of the first connector at a plurality of angular positions relative to the second connector.

In accordance with another embodiment, the hand held electronic device has a removable cover, and the first connector is removably attachable to the removable cover of the hand held electronic device.

In accordance with another embodiment, the removable cover has an outside surface and an opposite inside surface and an aperture therebetween. The first connector includes a planar member which is removably connectable to the second connector by a connective member which is shaped and dimensioned to pass through the aperture in the removable cover. Wherein the connective member can be passed through the aperture in the removable cover so that the planar member is disposed between the inside surface of the removable cover and the hand held electronic device.

In accordance with another embodiment, the connective member includes an elongated member, so that when the connective member is passed through the aperture in the removable cover, the elongated member is disposed external to the outside surface of the removable cover. The second connector is slidably connectable to the elongated member, so that the second connector can be longitudinally positioned along the elongated member.

Other possible embodiments, in addition to the possible embodiments enumerated above, will become apparent from the following detailed description, taken in conjunction with the accompanying drawings, which illustrate, by way of example, the principles of the method and coupling.

BRIEF DESCRIPTION OF THE DRAWINGS

FIG. 1 is a top plan view of a prior art hand held electronic device;

FIG. 2 is a front elevation view of the hand held electronic device;

FIG. 3 is a rear elevation view of the hand held electronic device;

FIG. 4 is a side elevation view of the hand held electronic device;

FIG. 5 is a front elevation view of coupling for attaching the hand held electronic device to a soft object;

FIG. 6 is a side elevation view of the coupling with a closed pin;

FIG. 7 is a side elevation view of the coupling with an open pin;

FIG. 8 is a bottom plan view of the coupling;

FIG. 9 is a rear elevation view of the coupling;

FIG. 10 is a perspective view of the coupling;

FIG. 11 is a perspective view of the coupling attached to the hand held electronic device;

FIG. 12 is a side elevation view of the coupling and attached hand held electronic device ready to be attached to the soft object;

FIG. 13 is a side elevation view of the coupling and attached hand held electronic device attached to the soft object;

FIG. 14 is a side elevation view of a second embodiment of the coupling;

FIG. 15 is a front elevation view of the second embodiment;

FIG. 16 is a front elevation view of a second connector rotated 90° with respect to a first connector;

FIG. 17 is a front elevation view of a second connector rotated another 90° with respect to a first connector;

FIG. 18 is a front elevation view of a second connector rotated another 90° with respect to a first connector;

FIG. 19 is a side elevation view of the rotational embodiment attaching the hand held electronic device to the soft object;

FIG. 20 is a side elevation view of the second embodiment with the first connector and attached hand held electronic device rotated with respect to the second connector and soft object;

FIG. 28 is a perspective view of a fourth embodiment attached to a hand held electronic device;

FIG. 29 is a reverse perspective view of the fourth embodiment attached to the hand held electronic device;

FIG. 30 is an exploded perspective view of the fourth embodiment and the hand held electronic device;

FIG. 31 is a side elevation view of the fourth embodiment attaching the hand held electronic device to a soft object;

FIG. 34 is a perspective view of a connective member and elongated member attached to the removable cover;

FIG. 35 is a perspective view of the other version of the third embodiment coupling attached to the hand held electronic device;

FIG. 36 is a front perspective view of the other version of the third embodiment coupling attached to the hand held electronic device; and, FIG. 37 is a rear perspective view of the other version of the third embodiment coupling attached to the hand held electronic device.

DETAILED DESCRIPTION OF THE INVENTION

Figure 21:
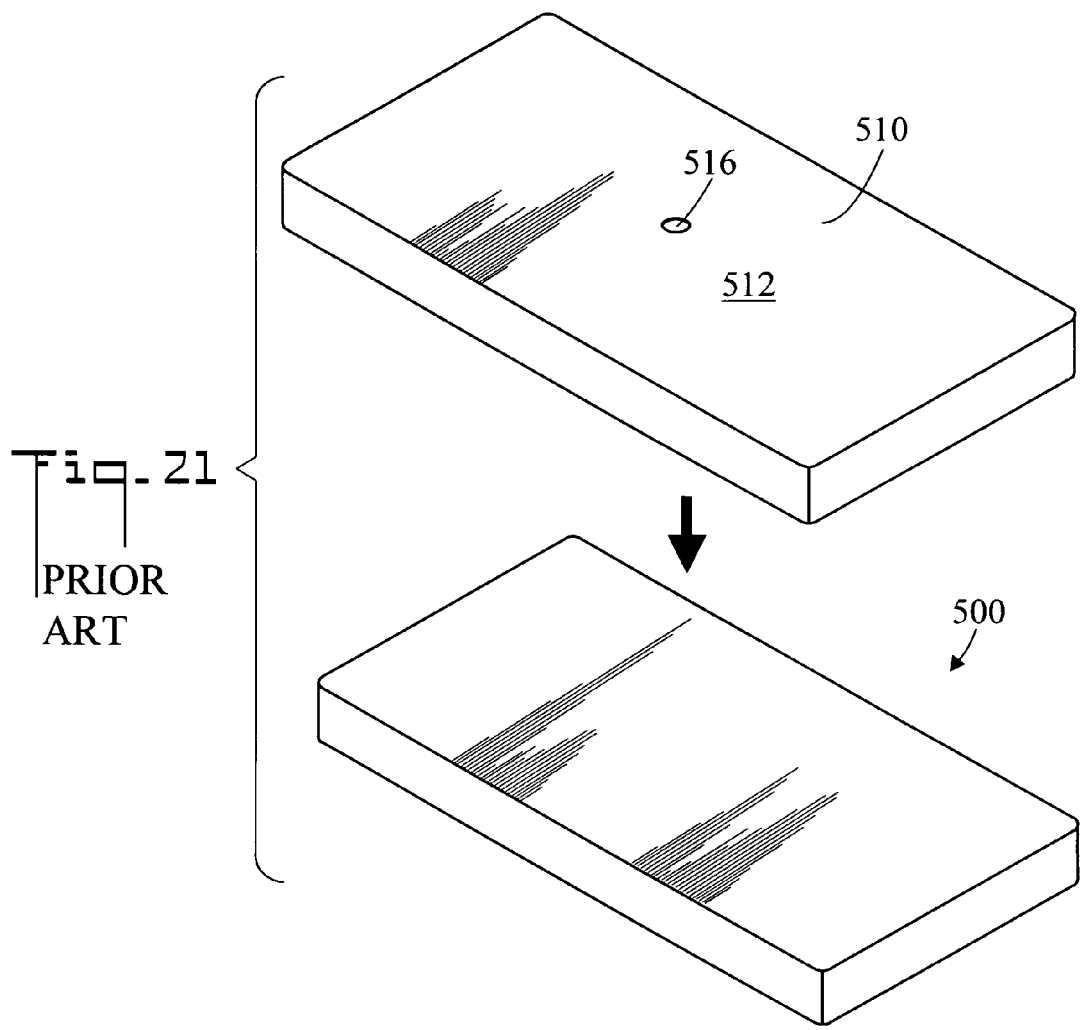
FIG. 21 is an exploded perspective view of a prior art hand held electronic device having a removable cover.

Referring initially to FIGS. 1-4, there are illustrated top plan, front elevation, rear elevation, and side elevation view respectively of a hand held electronic device, generally designated as 500. Hand held electronic device 500 can include a cell phone, a smart phone, a pda, a small computer, a calculator, a small TV, or any other electronic device which is designed to be held in the hand of a user when operated. Hand held electronic device 500 typically has a display screen 502 and control buttons or switches 504.

Now referring to FIGS. 5-10, there are illustrated front elevation, side elevation with a pin closed, side elevation with a pin open, bottom plan, rear elevation, and perspective views respectively of a coupling 20 for attaching hand held electronic device 500 to soft object 600 (refer also to FIGS. 12, 13, 19, 20, 26, and 27). FIG. 11 is a perspective view showing coupling 20 attached to hand held electronic device 500. As defined herein, soft object 600 can be any of a pillow, bedding, clothing, furniture, or any other soft deformable and preferably penetratable object to which coupling 20 can be attached. Coupling 20 includes a first side 22 and an opposite second side 24. A first connector 26 for removably attaching coupling 20 to hand held electronic device 500 is disposed on first side 22 of coupling 20. In the shown embodiment, first connector 26 includes an adhesive for effecting the attachment of coupling 20 to hand held electronic device 500, wherein the user causes the adhesive to adhere to hand held electronic device 500. However it may be appreciated that first connector 26 could also be a holder, a clamp, a clip, a magnet, hook and loop fasteners, or any other connecting mechanism which can removably connect coupling 20 to hand held electronic device 500. Coupling 20 also includes a second connector 28 for removably attaching coupling 20 to soft object 600 (refer to FIGS. 12, 13, 19, 20, 26, and 27), second connector 28 is disposed on second side 24 of coupling 20. In the shown embodiment, second connector 28 includes a pin 30 with a cooperating catch mechanism 32 for attaching coupling 20 to soft object 600. As with a conventional safety pin, pin 30 penetrates soft object 600 and is then locked in place with catch mechanism 32 (refer to FIGS. 13, 19, 20, 26, and 27). However it may be appreciated that second connector 28 could also be a clamp, a clip, an adhesive, hook and loop fasteners, or any other connecting mechanism which can connect coupling 20 to soft object 600. It is noted that in FIG. 10, the closed position of pin 30 is shown in broken lines.

FIG. 12 is a side elevation view of coupling 20 and attached hand held electronic device 500 ready to be attached to soft object 600. Pin 30 is open and ready for insertion in soft object 600. FIG. 13 is a side elevation view of coupling 20 and attached hand held electronic device 500 attached to soft object 600. Pin 30 has been passed through soft object 600 and then inserted in catch mechanism 32, in a similar fashion as a safety pin.

FIG. 14 is a side elevation view of a second embodiment of coupling 20. In this embodiment, first connector 26 is rotatable with respect to second connector 28, so that when coupling 20 attaches hand held electronic device 500 to soft object 600, hand held electronic device 500 can be rotated to a desired angular position (refer to FIGS. 19 and 20). In the shown embodiment, the rotation is effected by splitting coupling 20 in half and providing an axle 34 which rotationally connects first connector 26 and second connector 28.

FIGS. 15-18 show second connector 28 at different rotational positions with respect to first connector 26 (refer to FIG. 14). As shown, second connector 28 has been rotated 90° between views. It may be appreciated that other amounts of angular rotation could also be performed (e.g. 30°, 60°, 45°, 37°, etc.).

FIG. 19 is a side elevation view of the rotational embodiment of coupling 20 attaching hand held electronic device 500 to soft object 600. FIG. 20 is a side elevation view of the rotational embodiment with first connector 26 and attached hand held electronic device 500 rotated with respect to second connector 28 and soft object 600. The rotation feature allows a user to place hand held electronic device 500 at a desired viewing angle.

In another aspect of the rotational embodiment, coupling includes a detent mechanism which rotationally connects first connector 26 and second connector 28. The detent mechanism stops and releases the rotation of first connector 26 at a plurality of angular positions relative to second connector 28. That is, the detent mechanism biases first connector 26 to one of a plurality of angular positions with respect to second connector 28. For example in FIGS. 15-18, the detent mechanism could cause first connector 26 to stop and reside at the shown 90° stable angular positions. First connector 26 can be rotated to other angular positions, but because of the detent mechanism will tend to stay in the shown 90° positions. The detent function can be effected with mechanisms well known in the art such as notches, protuberances, grooves, springs, and the like (refer also to FIG. 25 and the associated discussion).

FIG. 21 is an exploded perspective view of a prior art hand held electronic device 500 having a removable cover 510. Removable cover 510 is shaped and dimensioned to fit over and receive hand held electronic device 500 for protective purposes. Removable cover 510 is typically make from rubber, and fits over hand held electronic device 500 in a fashion similar to how a contoured sheet fits over a mattress. Removable cover 510 has an outside surface 512 and an opposite inside surface 514 (refer to FIG. 24), and an aperture 516 therebetween.

Figure 22:
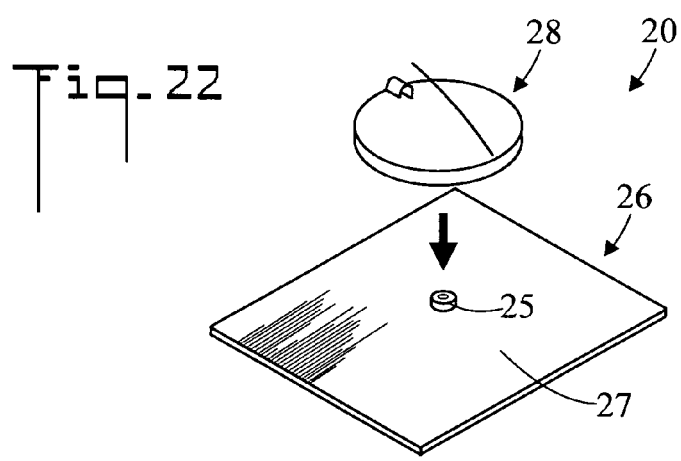
FIG. 22 is a perspective view of a third embodiment of the coupling.

FIG. 22 is a perspective view of a third embodiment of coupling 20. In this embodiment first connector 26 of coupling 20 is removably attachable to cover 510 of hand held electronic device 500 (rather than being directly attachable to hand held electronic device 500 as in the previous embodiments). First connector 26 includes a planar member 27 which is removably connectable to second connector 28 by a connective member 25 which is shaped and dimensioned to pass through aperture 516 in removable cove 510. Connective member 25 can be passed through aperture 516 in removable cover 510 so that the planar member 27 is disposed between inside surface 514 of removable cover 510 and hand held electronic device 500 (refer also to FIG. 24 and the associated discussion).

Figure 23:
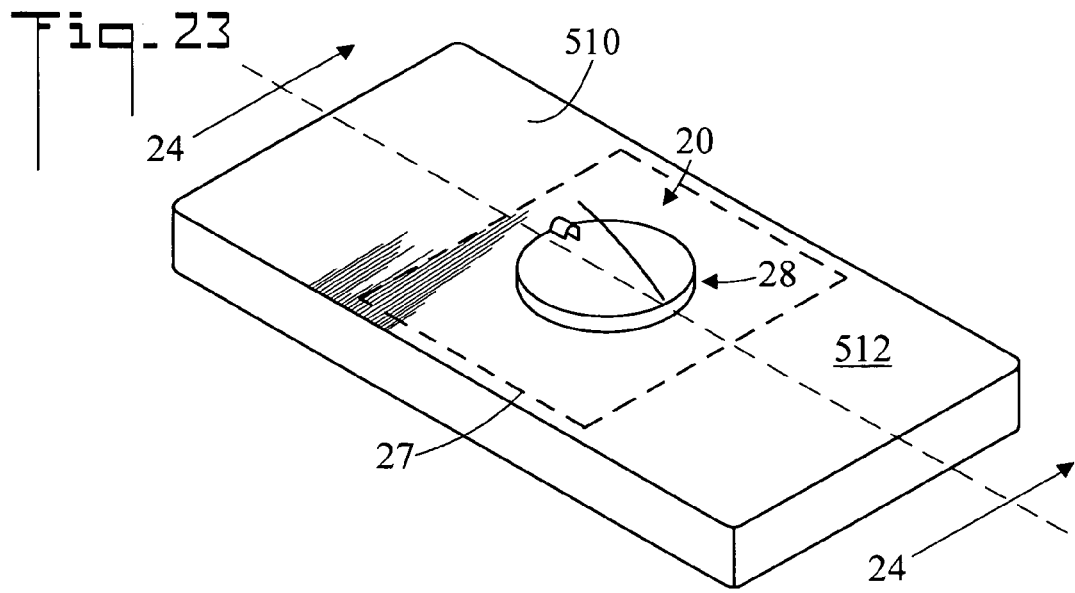
FIG. 23 is a perspective view of the third embodiment attached to the hand held electronic device and cover.
Figure 24:
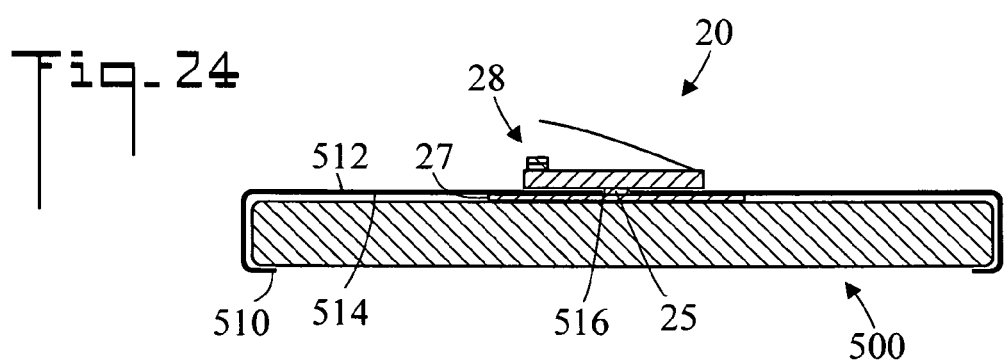
FIG. 24 is a cross sectional view along the line 24-24 of FIG. 23.

FIG. 23 is a perspective view of the third embodiment coupling 20 attached to hand held electronic device 500 and cover 510, and FIG. 24 is a cross sectional view along the line 24-24 of FIG. 23. Coupling 20 is attached to cover 510 prior to cover 510 being placed on hand held electronic device 500. Connective member 25 is passed through aperture 516 in removable cover 510 so that planar member 27 is disposed between inside surface 514 of removable cover 500 and hand held electronic device 500. Connective member 25 is then used to connect first connector 26 to second connector 28, wherein second connector 28 is disposed adjacent outside surface 516 of removable cover 510. That is, first connector 26 (i.e. planar member 27) resides inside removable cover 510, and second connector 28 resides outside removable cover 510 so that second connector 28 is available for attachment to soft object 510 (refer to FIG. 12).

Figure 25:
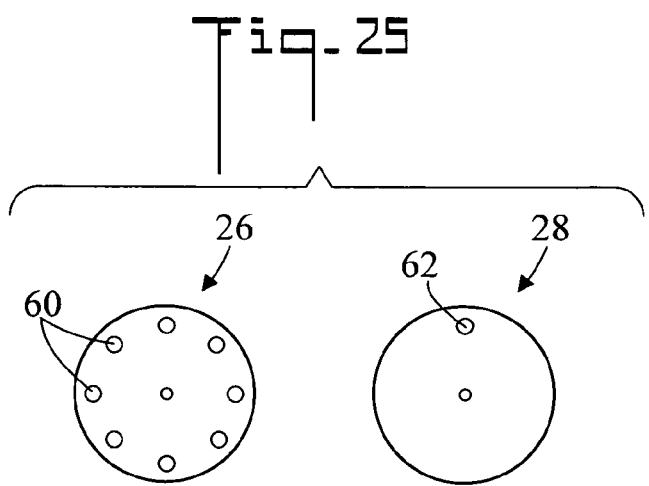
FIG. 25 is a front elevation view of a detent mechanism.

FIG. 25 is a front elevation view of one possible detent mechanism. Referring also to FIG. 14, the face of first connector 26 has a plurality of angularly space-apart notches 60 (every 45° in the shown embodiment). The face of second connector 28 has one knob 62 which is shaped and dimensioned to fit into notches 60. The face of first connector 26 is caused to engage the face of second connector 28 (such as through spring action), causing knob 62 to enter one of notches 60. As such, first connector 26 and second connector 28 will be biased into a stable angular relationship in 45° increments.

Figure 26:
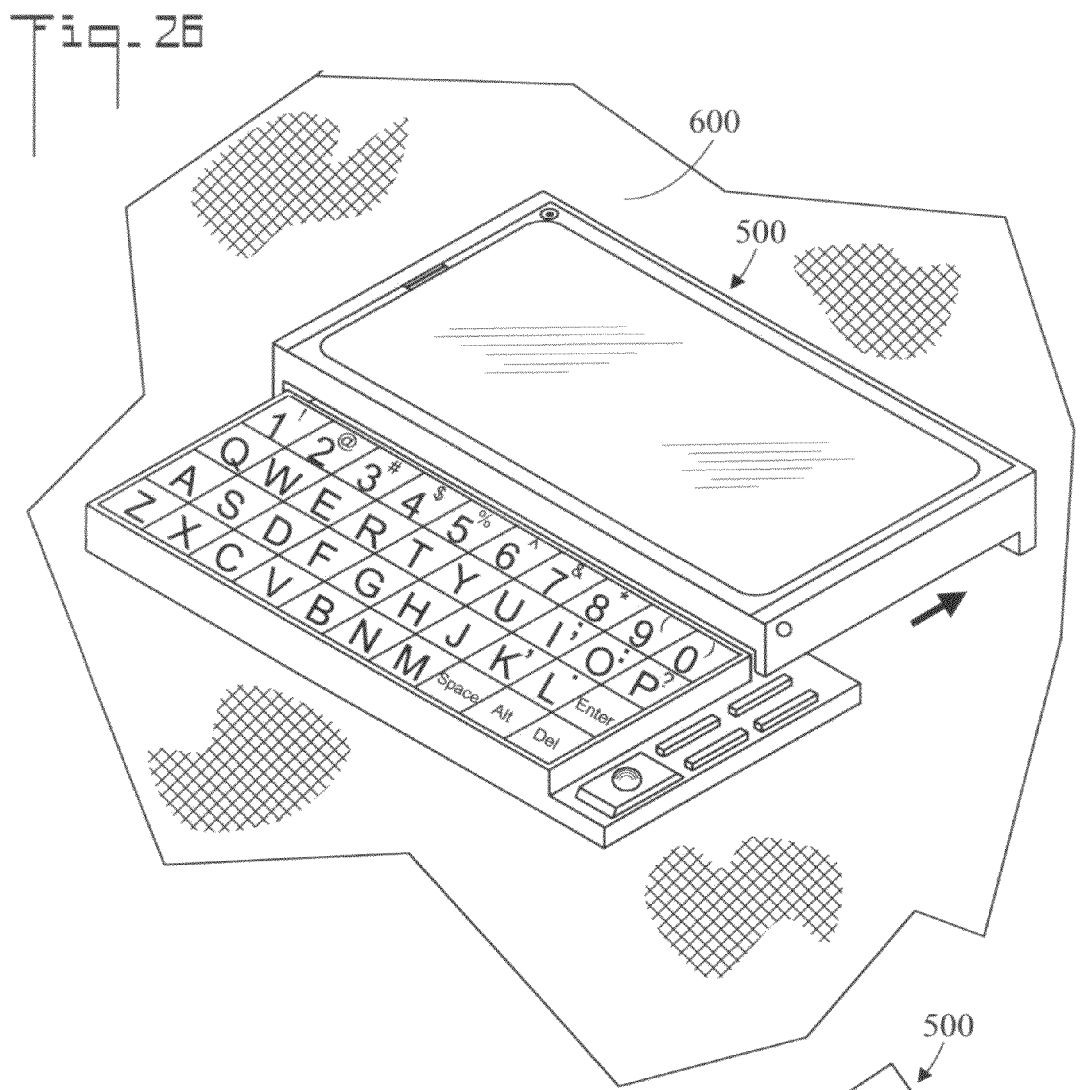
FIG. 26 is a perspective view of the coupling attaching a hand held electronic device to a soft object.
Figure 27:
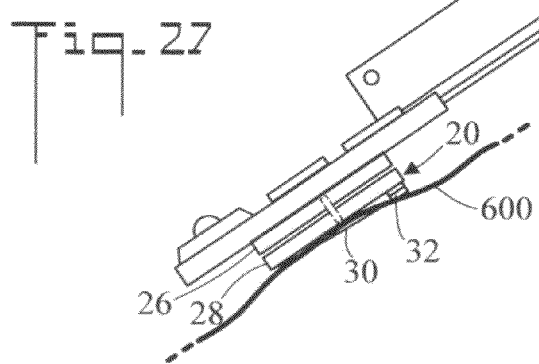
FIG. 27 is a side elevation view of the coupling attaching the hand held electronic device to the soft object.

FIGS. 26 and 27 are perspective and side elevation views respectively of coupling 20 attaching hand held electronic device 500 to soft object 600 (such as the surface of a pillow).

FIGS. 28-31 are perspective, reverse perspective, exploded perspective, and side Elevation views respectively of a fourth embodiment coupling 20 attached to hand held electronic device 500. In this embodiment, first connector 26 includes a holder for accepting and holding hand held electronic device 500. In the shown embodiment the holder has four arms 40 which releasibly clamp around hand held electronic device 500. Second connector 28 includes a flange 43 having a first end 44, an opposite second end 46, and a central portion 48. In the shown embodiment, first 44 and second 46 ends of flange 43 are curved away from first connector 26. Pin 30 and catch mechanism 32 are disposed at first end 44 of flange 43. First connector 26 and second connector 28 (i.e. flange 43) are rotationally connected by a rotational device 50 so that the flange 43 rotates about central portion 48 with respect to first connector 26. When second connector 28 is attached to soft object 600 (at 47, refer to FIG. 31), second end 46 of flange 43 abuts the surface of soft object 600 and retains hand held electronic device 500 substantially parallel to the surface of soft object 600. Referring to FIGS. 30 and 31, second connector 28 is attached to soft object 600 by pin 30.

Figure 32:
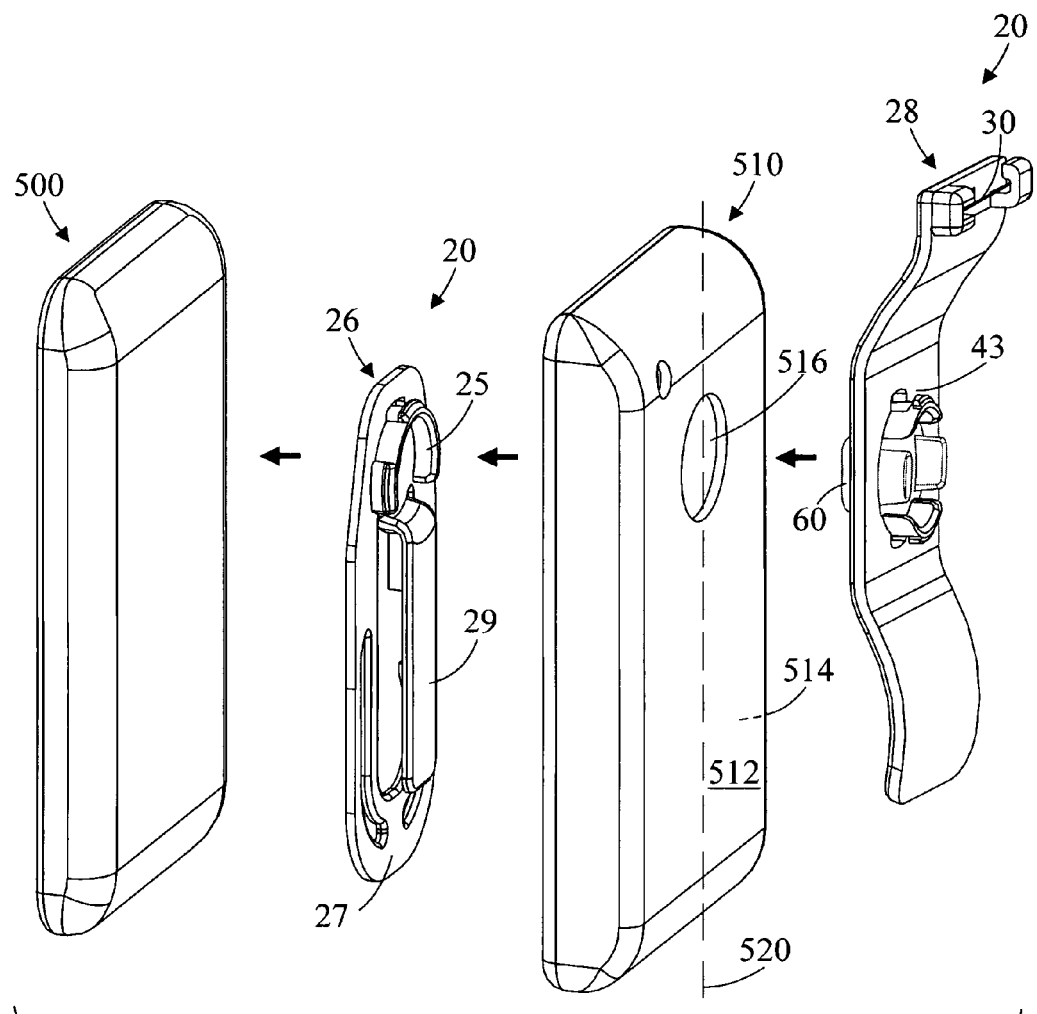
FIG. 32 is an exploded perspective view of another version of the third embodiment coupling shown in FIGS. 22-24.
Figure 33:
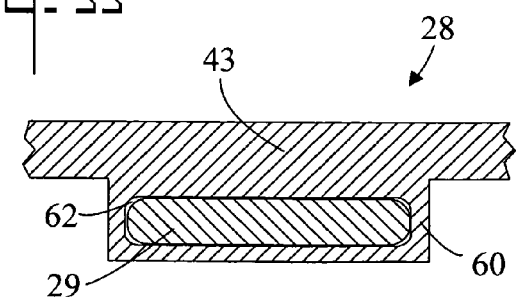
FIG. 33 is an enlarged fragmented cross sectional view of a slider receiving an elongated member.

FIG. 32 is an exploded perspective view of another version of the third embodiment shown in FIGS. 22-24. As in the embodiment of FIGS. 22-24, hand held electronic device 500 includes a removable cover 510 which is shaped and dimensioned to fit over and receive hand held electronic device 500 for protective purposes. As with the embodiment of FIGS. 22-24, removable cover 510 has an outside surface 512 and an opposite inside surface 514, and an aperture 516 therebetween. However, in this embodiment aperture 516 is not centered along the longitudinal axis 520 of removable cover 510, but is rather disposed toward one end of the cover. As in the embodiment of FIGS. 22-24, first connector 26 includes a planar member 27 which is removably connectable to second connector 28 by a connective member 25 which is shaped and dimensioned to pass through aperture 516 in removable cover 510. Connective member 25 can be passed through aperture 516 in removable cover 25 so that planar member 27 is disposed between inside surface 514 of removable cover 510 and hand held electronic device 500 (refer also to FIG. 34). Connective member 25 includes an elongated member 29, so that when said connective member 25 is passed through aperture 516 in removable cover 510, elongated member 29 is disposed external to outside surface 512 of removable cover 510 as is depicted in FIG. 34. FIG. 32 also depicts second connector 28 which is similar to the second connector embodiment shown in FIGS. 28-31, wherein second connector 28 includes a flange 43 with a pin 30 on one end. Second connector 28 further includes a slider 60 having a slot 62 which slidably receives and frictionally holds elongated member 29 (refer to FIG. 33) so that second connector 28 can be slidably positioned to a desired location along elongated member 29. This feature compensates for the off center position of aperture 516 in removable cover 510, and allows second connector 28 to be centered with respect to hand held electronic device 500 (refer to FIGS. 36 and 37)

FIG. 34 is a perspective view of a connective member 25 and elongated member 29 attached to removable cover 510. Connective member 25 has been passed through aperture 516 in removable cover of handheld electronic device 500 so that planar member 27 resides between hand held electronic device 500 and inside surface 514 of removable cover 510.

FIG. 35 is a perspective view of the other version of the third embodiment coupling 20 attached to hand held electronic device 500. Second connector 28 is slidably connectable (via slider 60 and slot 60, refer to FIG. 33) to elongated member 29 of connective member 25, so that second connector 28 can be longitudinally positioned (in the direction of the arrows) to a desired position along elongated member 28. It is noted that in this embodiment, second connector 28 is also rotatable with respect to first connector 26.

FIGS. 36 and 37 are front and rear perspective views respectively of the other version of the third embodiment coupling 20 attached to removable cover 510 of hand held electronic device 500. Second connector 28 is selectively positionable along elongated member 29 in the direction of the arrows. In the shown embodiment, second connector 28 has been rotated so that it is approximately perpendicular to elongated member 29.

It may be appreciated that coupling 20 can be combined with hand held electronic device 500 and soft object 600 to form a system for attaching a hand held electronic device 500 to a soft object 600.

In terms of use, a method for attaching a hand held electronic device 500 to a soft object 600 includes: (refer to FIGS. 1-37)

(a) providing a hand held electronic device 500;
(b) providing a soft object 600;
(c) providing a coupling 20 for attaching hand held electronic device 500 to soft object 600, including;
   a first side 22 and an opposite second side 24;
   a first connector 26 for removably attaching coupling 20 to hand held electronic device 500, first connector 26 disposed on first side 22 of coupling 20; and,
   a second connector 28 for removably attaching coupling 20 to soft object 600, second connector 28 disposed on second side 24 of coupling 20, second connector including a pin 30;
(d) using first connector 26 to attach coupling 20 to hand held electronic device 500; and,
(e) using pin 30 to pin second connector 28 to soft object 600.

The method further including:
in step (c), first connector 26 including a holder for holding hand held electronic device 500; and,
in step (d), causing the holder to accept and hold hand held electronic device 500.

The method further including:
in step (c), first connector 26 including an adhesive; and,
in step (d), causing the adhesive to adhere to the hand held electronic device 500.

The method further including:
in step (c), first connector 26 rotatable with respect to second connector 28; and,
after step (e), rotating first connector 26 with respect to second connector 28 thereby causing hand held electronic device 500 to rotate.

The method further including:
in step (c), said coupling including a detent mechanism which connects first connector 26 and second connector 28; the detent mechanism stopping and releasing the rotation of first connector 28 at a plurality of angular positions relative to second connector 28; and,
after step (e), using the detent mechanism to rotate first connector 26 to a desired angular position.

The method further including:
in step (a), hand held electronic device 500 having a removable cover 510,
in step (d), attaching first connector 26 to removable cover 510.

The method further including:
removable cover 510 having an outside surface 512 and an opposite inside surface 514 and an aperture 516 therebetween;
first connector 26 including a planar member 27 which is removably connectable to second connector 28 by a connective member 25 which is shaped and dimensioned to pass through aperture 516 in removable cover 510;
in step (d), passing connective member 25 through aperture 516 in removable cover 510 so that planar member 27 is disposed between inside surface 514 of removable cover 510 and hand held electronic device 500, and using connective member 25 to connect planer member 27 to second connector 28, wherein second connector 28 is disposed adjacent outside surface 512 of removable cover 510.

The method further including:
connective member 25 including an elongated member 29, so that when connective member 25 is passed through aperture 516 in removable cover 510, elongated member 29 is disposed external to outside surface 512 of removable cover 510;
second connector 28 slidably connectable to elongated member 29, so that second connector 28 can be longitudinally positioned along elongated member; 29 and,
sliding second connector 28 to a desired position along elongated member 29.

The method, further including:
in step (b), soft object 600 having a surface;
in step (c), second connector 28 including a flange 43 having a first end 44, an opposite second end 46, and a central portion 48;
in step (c), second connector 28 including a pin 30, pin 30 disposed at first end 44 of flange 43;
in step (c), first connector 26 and second connector 28 rotationally connected so that flange 43 rotates about central portion 48;
in step (e), when second connector 28 is attached to soft object 600, second end 46 of flange 43 abuts soft object 600 and retains hand held electronic device 500 substantially parallel to the surface of soft object 600; and,
after step (e), observing that hand held electronic device 500 is disposed substantially parallel to the surface of soft object 600.

The possible embodiments of the method and coupling described herein are exemplary and numerous modifications, combinations, variations, and rearrangements can be readily envisioned to achieve an equivalent result, all of which are intended to be embraced within the scope of the appended claims. Further, nothing in the above-provided discussions of the method and coupling should be construed as limiting the invention to a particular embodiment or combination of embodiments. The scope of the invention is best defined by the appended claims.

I claim:

1. A method for attaching a hand held electronic device to a soft object, comprising:
   (a) providing a hand held electronic device;
   (b) providing a soft object;
   (c) providing a coupling for attaching said hand held electronic device to said soft object, including;
      a first side and an opposite second side;
      a first connector for removably attaching said coupling to the hand held electronic device, said first connector disposed on said first side of said coupling; and,
      a second connector for removably attaching said coupling to the soft object, said second connector disposed on said second side of said coupling, said second connector including a pin;
   (d) using said first connector to attach said coupling to said hand held electronic device;
   (e) using said pin to pin said second connector to said soft object;
   in step (c), said first connector including a holder for holding said hand held electronic device;
   in step (d), causing said holder to accept and hold said hand held electronic device;
   in step (c), said first connector rotatable with respect to said second connector; and, after step (e), rotating said first connector with respect to said second connector thereby causing said hand held electronic device to rotate.

2. The method of claim 1, further including:
in step (c), said coupling including a detent mechanism which connects said first connector and said second connector; said detent mechanism stopping and releasing the rotation of said first connector at a plurality of angular positions relative to said second connector; and,
after step (e), using said detent mechanism to rotate said first connector to a desired angular position.

3. A method for attaching a hand held electronic device to a soft object, comprising:
(a) providing a hand held electronic device;
(b) providing a soft object;
(c) providing a coupling for attaching said hand held electronic device to said soft object, including;
a first side and an opposite second side;
a first connector for removably attaching said coupling to the hand held electronic device, said first connector disposed on said first side of said coupling; and,
a second connector for removably attaching said coupling to the soft object, said second connector disposed on said second side of said coupling;
(d) using said first connector to attach said coupling to said hand held electronic device;
(e) using said pin to pin said second connector to said soft object;
in step (b), said soft object having a surface;
in step (c), said second connector including a flange having a first end, an opposite second end, and a central portion;
in step (c), said second connector including a pin, said pin disposed at said first end of said flange;
in step (c), said first connector and said second connector rotationally connected so that said flange rotates about said central portion;
in step (e), when said second connector is attached to said soft object, said second end of said flange abuts said soft object and retains said hand held electronic device substantially parallel to said surface of the soft object; and,
after step (e), observing that said hand held electronic device is disposed substantially parallel to said surface of said soft object.

4. A coupling for attaching a hand held electronic device to a soft object, comprising:
a first side and an opposite second side;
a first connector for removably attaching said coupling to the hand held electronic device, said first connector disposed on said first side of said coupling;
a second connector for removably attaching said coupling to the soft object, said second connector disposed on said second side of said coupling, said second connector including a pin;
said second connector including a flange having a first end, an opposite second end, and a central portion;
said pin disposed at said first end of said flange; and,
said first connector and said second connector rotationally connected so that said flange rotates about said central portion.

5. The coupling according to claim 4, the soft object having a surface, said coupling further including:
when said second connector is attached to the soft object, said second end of said flange abuts the soft object and retains the hand held electronic device substantially parallel to the surface of the soft object.

6. A coupling for attaching a hand held electronic device to a soft object, comprising:
a first side and an opposite second side;
a first connector for removably attaching said coupling to the hand held electronic device, said first connector disposed on said first side of said coupling;
a second connector for removably attaching said coupling to the soft object, said second connector disposed on said second side of said coupling, said second connector including a pin; and,
said first connector rotatable with respect to said second connector.

7. The coupling according to claim 6, further including:
a detent mechanism which connects said first connector and said second connector; and,
said detent mechanism stopping and releasing the rotation of said first connector at a plurality of angular positions relative to said second connector.

8. A system for attaching a hand held electronic device to a soft object, comprising:
a hand held electronic device;
a soft object;
a coupling for attaching said hand held electronic device to said soft object, said coupling having a first side and an opposite second side;
a first connector for removably attaching said coupling to said hand held electronic device, said first connector disposed on said first side of said coupling;
a second connector for removably attaching said coupling to said soft object, said second connector disposed on said second side of said coupling, said second connector including a pin;
said second connector including a flange having a first end, an opposite second end, and a central portion; and,
said first connector and said second connector rotationally connected so that said flange rotates about said central portion.

9. The system according to claim 8, further including:
said soft object having a surface; and,
when said second connector is attached to said soft object, said second end of said flange abuts said soft object and retains said hand held electronic device substantially parallel to said surface of said soft object.

10. A system for attaching a hand held electronic device to a soft object comprising:
a hand held electronic device;
a soft object;
a coupling for attaching said hand held electronic device to said soft object, said coupling having a first side and an opposite second side;
a first connector for removably attaching said coupling to said hand held electronic device, said first connector disposed on said first side of said coupling;
a second connector for removably attaching said coupling to said soft object, said second connector disposed on said second side of said coupling, said second connector including a pin; and,
said first connector rotatable with respect to said second connector.

11. The system according to claim 10, further including:
a detent mechanism which connects said first connector and said second connector; and,
said detent mechanism stopping and releasing the rotation of said first connector at a plurality of angular positions relative to said second connector.

* * * * *

UNITED STATES PATENT AND TRADEMARK OFFICE
CERTIFICATE OF CORRECTION

PATENT NO. : 8,353,491 B2  
APPLICATION NO. : 12/927548  
DATED : January 15, 2013  
INVENTOR(S) : Arthur E. Mezue Page 1 of 1

It is certified that error appears in the above-identified patent and that said Letters Patent is hereby corrected as shown below:

Claim 3, Col. 9, lines 12-43 should read:
3. A method for attaching a hand held electronic device to a soft object, comprising:
   (a) providing a hand held electronic device;
   (b) providing a soft object;
   (c) providing a coupling for attaching said hand held electronic device to said soft object, including;
      -a first side and an opposite second side;
      -a first connector for removably attaching said coupling to the hand held electronic device, said first connector disposed on said first side of said coupling; ~~and,~~
      -a second connector for removably attaching said coupling to the soft object, said second connector disposed on said second side of said coupling;
      -<u>said second connector including a flange having a first end, an opposite second end, and a central portion; and,</u>
      -<u>said second connector including a pin, said pin disposed at said first end of said flange;</u>
   (d) using said first connector to attach said coupling to said hand held electronic device;
   (e) using said pin to pin said second connector to said soft object;
   in step (b), said soft object having a surface;
   ~~in step (c), said second connector including a flange having a first end, an opposite second end, and a central portion;~~
   ~~in step (c), said second connector including a pin, said pin disposed at said first end of said flange;~~
   in step (c), said first connector and said second connector rotationally connected so that said flange rotates about said central portion;
   in step (e), when said second connector is attached to said soft object, said second end of said flange abuts said soft object and retains said hand held electronic device substantially parallel to said surface of the soft object; and,
   after step (e), observing that said hand held electronic device is disposed substantially parallel to said surface of said soft object.

Signed and Sealed this  
Twenty-sixth Day of March, 2013

Teresa Stanek Rea  
*Acting Director of the United States Patent and Trademark Office*